US011977927B2

(12) United States Patent
Velasco

(10) Patent No.: US 11,977,927 B2
(45) Date of Patent: May 7, 2024

(54) DEPLOYING DYNAMIC APPLICATIONS AND INFRASTRUCTURE ACCORDING TO METADATA ASSIGNED BY CONTENT

(71) Applicant: International Business Machines Corporation, Armonk, NY (US)

(72) Inventor: Marc Velasco, Orange, CA (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 17/244,085

(22) Filed: Apr. 29, 2021

(65) Prior Publication Data

US 2022/0350673 A1 Nov. 3, 2022

(51) Int. Cl.
*G06F 9/50* (2006.01)
*G06F 9/455* (2018.01)
*G06F 9/48* (2006.01)
*H04L 67/56* (2022.01)
*H04L 67/561* (2022.01)
*H04L 67/567* (2022.01)

(52) U.S. Cl.
CPC .......... *G06F 9/5077* (2013.01); *G06F 9/455* (2013.01); *G06F 9/48* (2013.01); *G06F 9/50* (2013.01); *G06F 9/5005* (2013.01); *G06F 9/5011* (2013.01); *G06F 9/5022* (2013.01); *G06F 9/5055* (2013.01); *H04L 67/561* (2022.05); *H04L 67/567* (2022.05)

(58) Field of Classification Search
CPC ... G06F 9/455; G06F 9/48; G06F 9/50; G06F 9/5005; G06F 9/5011; G06F 9/5022; G06F 9/5055; G06F 9/5072; G06F 9/5077; H04L 67/561; H04L 67/567
See application file for complete search history.

(56) References Cited

U.S. PATENT DOCUMENTS

| 9,141,363 | B2 | 9/2015 | Walter |
| 10,394,793 | B1 | 8/2019 | Todd |
| 10,437,566 | B2 | 10/2019 | Krishnamurthy |
| 10,802,660 | B1 | 10/2020 | Krivopaltsev |
| 11,330,070 | B1* | 5/2022 | Nair ...................... H04L 67/561 |
| 2012/0137268 | A1 | 5/2012 | Dattke |
| 2012/0226770 | A1* | 9/2012 | Schapira ............... H04L 67/561 |
| | | | 709/217 |
| 2012/0246701 | A1* | 9/2012 | Swamy ................... G06F 17/00 |
| | | | 726/4 |
| 2014/0289391 | A1 | 9/2014 | Balaji |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

(Continued)

*Primary Examiner* — Charles M Swift
(74) *Attorney, Agent, or Firm* — Michael A. Petrocelli

(57) ABSTRACT

Methods, computer program products, and/or systems are provided that perform the following operations: obtaining metadata associated with a content item, wherein the metadata includes at least one runtime metadata definition; identifying an environment for providing access to the content item based on a runtime metadata definition; implementing the environment based, at least in part, on the runtime metadata definition; and providing access to the content item in the environment.

20 Claims, 13 Drawing Sheets

(56) References Cited

U.S. PATENT DOCUMENTS

| | | | |
|---|---|---|---|
| 2016/0044043 A1* | 2/2016 | Bouvet | H04L 63/105 726/1 |
| 2016/0164947 A1 | 6/2016 | Calvin | |
| 2016/0170739 A1 | 6/2016 | Kapashikov | |
| 2017/0272543 A1* | 9/2017 | Lo | H04L 67/75 |
| 2018/0144830 A1 | 5/2018 | James | |
| 2018/0191798 A1* | 7/2018 | Zhu | H04L 67/06 |
| 2019/0095254 A1* | 3/2019 | Rao | G06F 11/3476 |
| 2020/0394055 A1 | 12/2020 | Knourenko | |
| 2020/0409513 A1 | 12/2020 | Krivopaltsev | |

OTHER PUBLICATIONS

IBM, List of IBM Patents or Patent Applications Treated as Related, Appendix P, dated May 3, 2021, 2 pages.

* cited by examiner

System Flow

DEPLOYING DYNAMIC APPLICATIONS AND INFRASTRUCTURE ACCORDING TO METADATA ASSIGNED BY CONTENT

BACKGROUND

The present invention relates generally to the field of content management, and more particularly to providing for the use of content metadata to deploy dynamic applications and infrastructure for use with content.

SUMMARY

According to an aspect of the present invention, there is a method, computer program product and/or system that performs the following operations (not necessarily in the following order): obtaining metadata associated with a content item, wherein the metadata includes at least one runtime metadata definition; identifying an environment for providing access to the content item based on a runtime metadata definition; implementing the environment based, at least in part, on the runtime metadata definition; and providing access to the content item in the environment.

DETAILED DESCRIPTION

Figure 1:
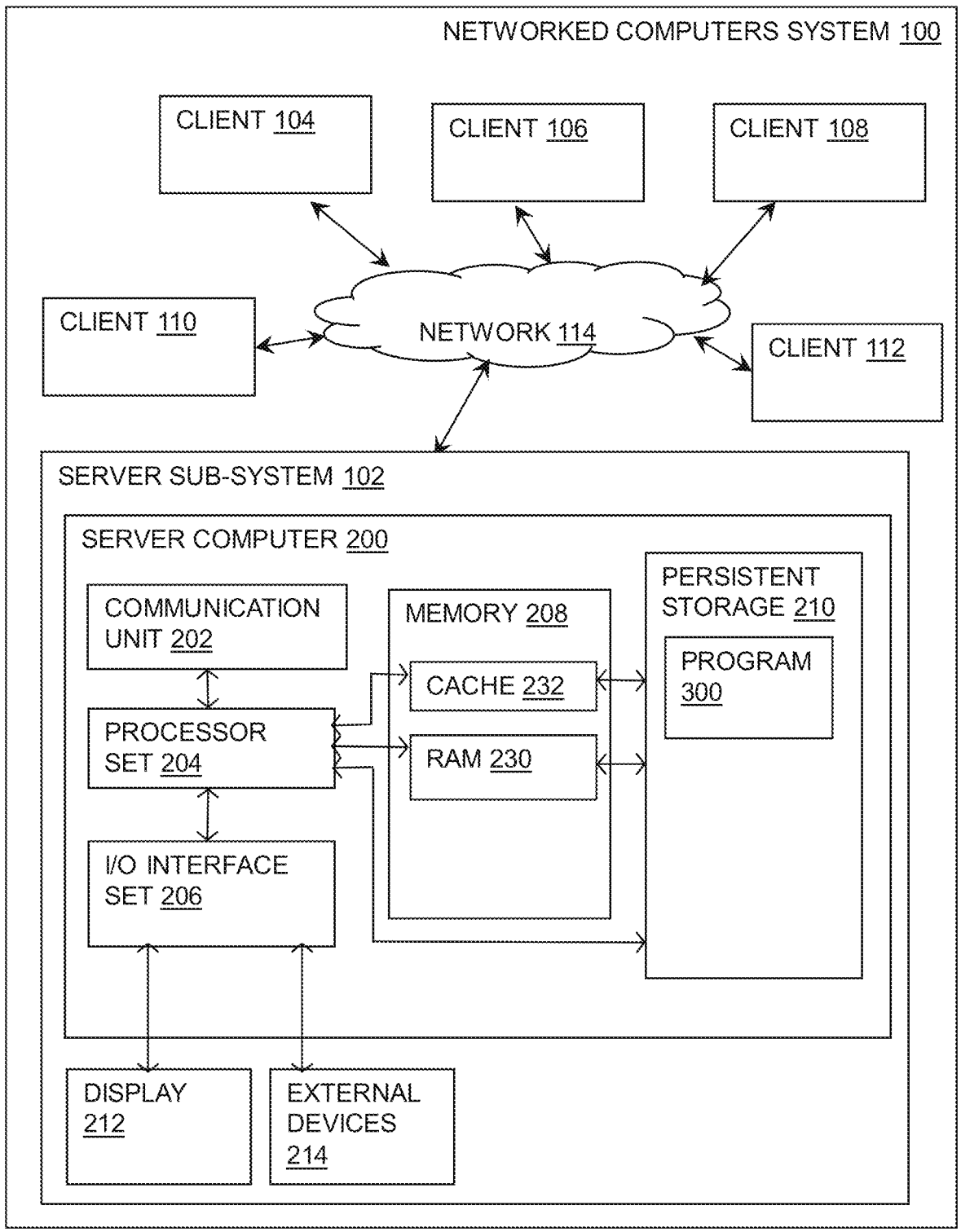
FIG. 1 depicts a block diagram view of a first embodiment of a system, according to the present invention.

According to aspects of the present disclosure, systems and methods can be provided for deploying dynamic applications, infrastructure, instances, and/or the like to access, present, and/or display content (e.g., content items) based on infrastructure data and/or associated data included in runtime metadata definition(s) provided in metadata associated with a content item. In particular, systems and methods of the present disclosure can provide for obtaining metadata associated with a requested content item and identifying a runtime metadata definition included in the metadata that can be used in providing a runtime environment (e.g., runtime applications, infrastructure, instances, and/or the like) to provide access (e.g., display, etc.) to the requested content item. The systems and methods of the present disclosure can provide for executing calls to instantiate infrastructure, runtime application(s), and/or the like to provision the runtime environment for the content item. The systems and methods of the present disclosure can provide access to (e.g., display, etc.) the requested content item in the provisioned environment.

Embodiments of the present invention can provide systems and methods for storing information about a runtime environment for a content item as metadata associated with the content item, for example, bundling the content data and one or more methods for accessing the content data together. Content items here can include, for example, documents, media, application specific data or document or media that requires a specific application to interact with the content. The metadata (e.g., runtime definition metadata, etc.) can control the method and technology by which the content is accessed (e.g., run time execution, etc.). Embodiments can provide for storing data associated with cloud and/or dynamic infrastructure, software as a service (SaaS) applications, and/or the like as metadata for a content item. For example, the metadata (e.g., associated/stored with the content, etc.) can be used in providing for accessing content, displaying content, and/or the like via a specific definition of a runtime environment (e.g., applications, infrastructure, etc.), rather than creating and tying a piece of content to a specific application, cloud infrastructure, technology stack, and/or the like. As one example, content items may include documents which can be accessed, presented, displayed, etc. via one or more applications such as content management applications, collaboration applications/platforms, and/or the like.

Application specific data can be stored as another object (e.g., metadata object, etc.) attached to the content (e.g., content item) such that the content item becomes the application metadata definition (e.g., application runtime environment, etc.), as opposed to tying the content to separate systems/applications that may be incompatible. The content item can then be accessed/displayed by as many applications as desired by providing multiple runtime metadata definitions (e.g., one definition for each application, etc.).

In some embodiments, runtime definition metadata associated with content items may include multiple runtime definitions (e.g., multiple instances of runtime metadata definitions, multiple metadata objects, etc.). Each runtime metadata definition can provide information for a specific definition of a run time environment, for example, associated with a particular application, cloud infrastructure, technology stack, and/or the like.

As an example, in some embodiments, content (e.g., content items, etc.) can be stored in a traditional type of data structure, database, or the like. The content storage can be provided by any type of database or data storage mechanism. The metadata for the content (e.g., content item, etc.) can be stored by reference, for example, in a relational database and can be referenced by a key, other identifier, and/or the like.

In some embodiments, the metadata specific to each runtime metadata definition for a content item can be stored as a separate metadata object. Each metadata object can include a key/identifier to the parent metadata for the content item. Each content item can have one or more runtime metadata definitions associated with the content item (e.g., provided as a metadata object for the content item, etc.) such that a content item can be accessed, presented, displayed, etc. using one or more applications, infrastructures, and/or the like (e.g., one runtime metadata definition associated with each defined application, etc.). When a content item is created, at least one runtime metadata definition is created for the content item defining how the content should be executed at runtime (e.g., the runtime environment for accessing, displaying, etc. the content).

A runtime metadata definition can include data defining the infrastructure, applications, containers, security, databases, configuration information, any other information, and/or the like needed to build a link to the content (e.g., content item, etc.) and to display/provide the content. The runtime metadata definition will be different for each particular application used to display/provide the content item. As an example, a very simplified format for a runtime metadata definition for a content management application might be represented as follows.

```
{
infrastructure:
type: virtual:container
size: small
storage: managed_disk
application:
container: vendorA/contentapp
storage: 100gb:/testmnt
ports: 9080
database: jdbcurl1 @testurl
ldap: MSAD:myldap.test.com:636
}
```

In some embodiments, content items can have one or multiple runtime metadata definitions (e.g., one for each application to be used to display/provide the content item). The application specific data will be included only within these runtime metadata definitions. In some embodiments, the infrastructure metadata and the application metadata can be stored together. Additionally, or alternatively, the application metadata and the infrastructure metadata can be defined and referenced separately. For example, different applications may have similar infrastructure needs (e.g., infrastructure reused, etc.) and as such, a "reference" infrastructure may be utilized by multiple applications. In such a case, application metadata data might be defined for each application separate from the infrastructure metadata (e.g., used by all the applications, etc.).

In general, to access a particular content item, a user has to go through a specific application, browser, and/or the like that is tied to the content, for example using an infrastructure and/or the like designated by an application owner, developer, provider, and/or the like. Typically, each application would pre-create or create an infrastructure for the application and deploy into the infrastructure which is often a singular experience. For example, different content providers may each have their own infrastructure that supports their own individual applications.

Accordingly, embodiments of the present invention can provide systems and methods to display content to a user without being tied to a singular infrastructure/runtime application setup by deploying infrastructure and runtime applications based on metadata associated with a content item to be displayed. In particular, embodiments of the present invention can provide systems and methods for deploying the dynamic infrastructure, SaaS instances, and/or the like needed for content, where infrastructure and associated information (e.g., runtime information, etc.) is defined in metadata for the content. As an example, in some embodiments, a user may select or be directed to content. The redirection can trigger deployment of infrastructure to display and work with the requested content. Once work with the content is finished, the infrastructure, applications, content, and/or the like may be dematerialized, the infrastructure may be deallocated, the application(s) may be stopped, and the content may remain where it was originally stored. Some embodiments of the present invention may provide true on demand servicing of content that may be realized for multiple application and independent of an infrastructure type. For example, a user can deploy to a selected infrastructure based on their preference and/or the link for the content they are following. As such, some embodiments of the present invention may provide true infrastructure agnostic features for content and content providers.

According to other aspects of the present invention, some embodiments may provide systems and methods to generate and/or modify data defined for infrastructure, runtime information, and/or the like, for accessing a content item, for example, when working with content (e.g., a content item, etc.), based on interaction(s) with content (e.g., a content item, etc.), and/or the like. In particular, in some embodiments, systems and methods can provide for creating and/or modifying metadata defining runtime application information, infrastructure information, and/or the like for content (e.g., a content item, etc.). For example, some embodiments can provide for defining, generating, and storing runtime application information, infrastructure information, and/or the like as metadata while creating, editing, and/or otherwise working with content. Additionally, in some embodiments, systems and methods can provide for modifying, deleting, and/or the like stored runtime definition metadata (e.g., runtime application information, infrastructure information, etc.) for content (e.g., a content item, etc.). In some embodiments, systems and methods can also provide for "publishing" content to a different runtime environment (e.g., different from an environment/application used to create the content, etc.) by defining runtime application information, infrastructure information, and/or the like for the different runtime environment and storing the information as metadata for the content.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can provide for deploying dynamic applications and/or infrastructure to access/provide/display content based on metadata associated with the content, creating runtime metadata definitions for applications/infrastructure, storing the runtime metadata definition(s) as metadata for the content, modifying runtime metadata definition(s) associated with content, and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
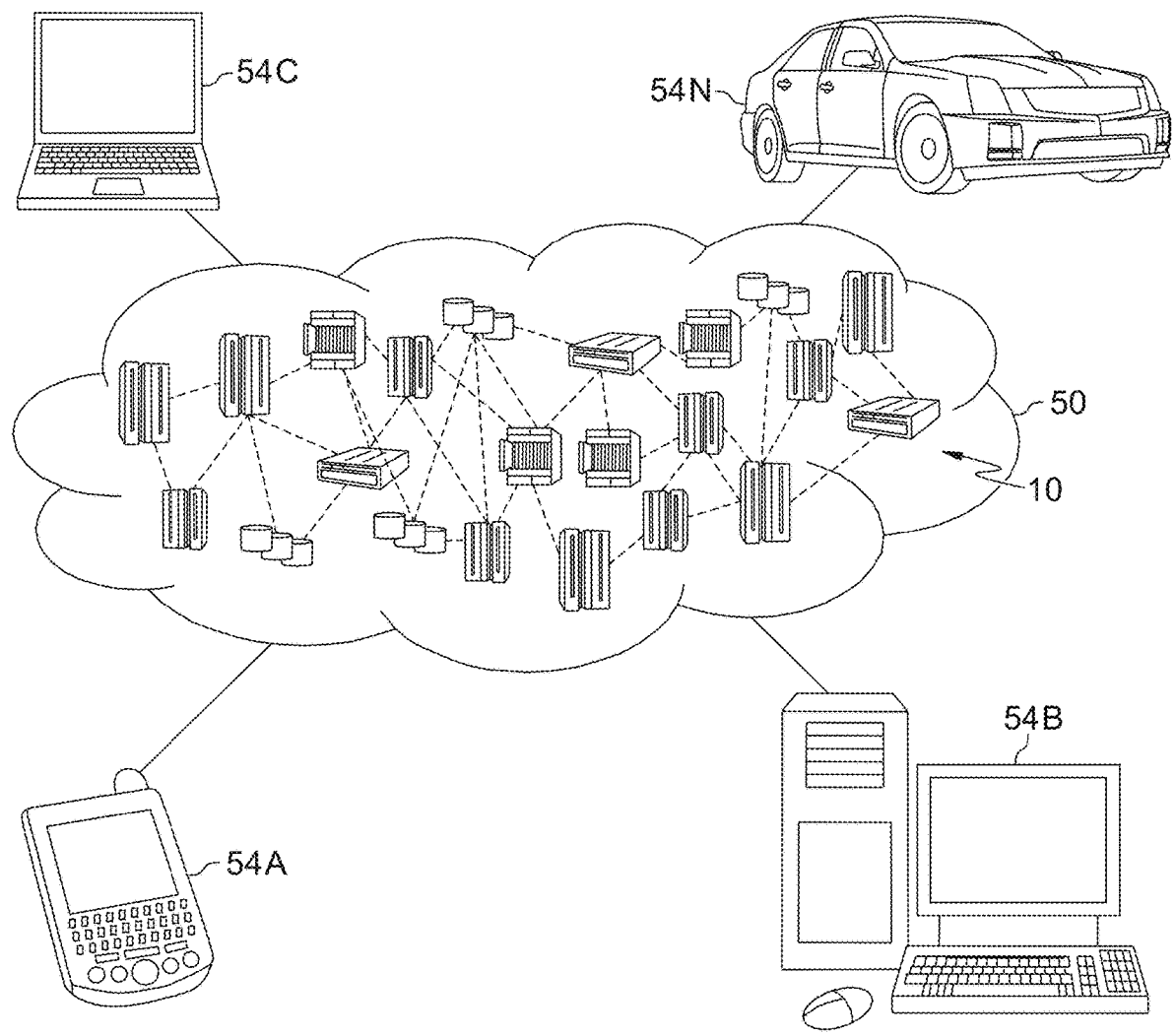
FIG. 2 depicts a cloud computing environment, according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
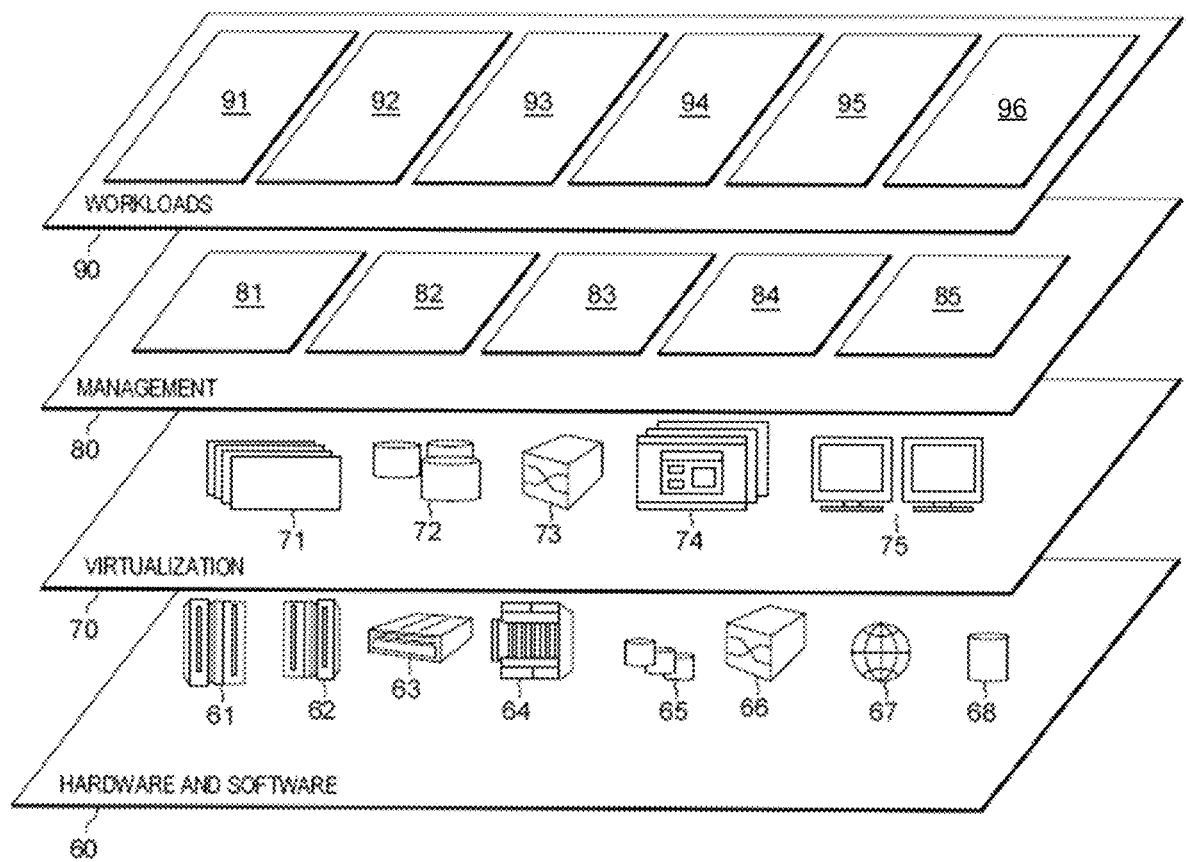
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content application/infrastructure deployment 96.

Example Embodiments

Figure 4:
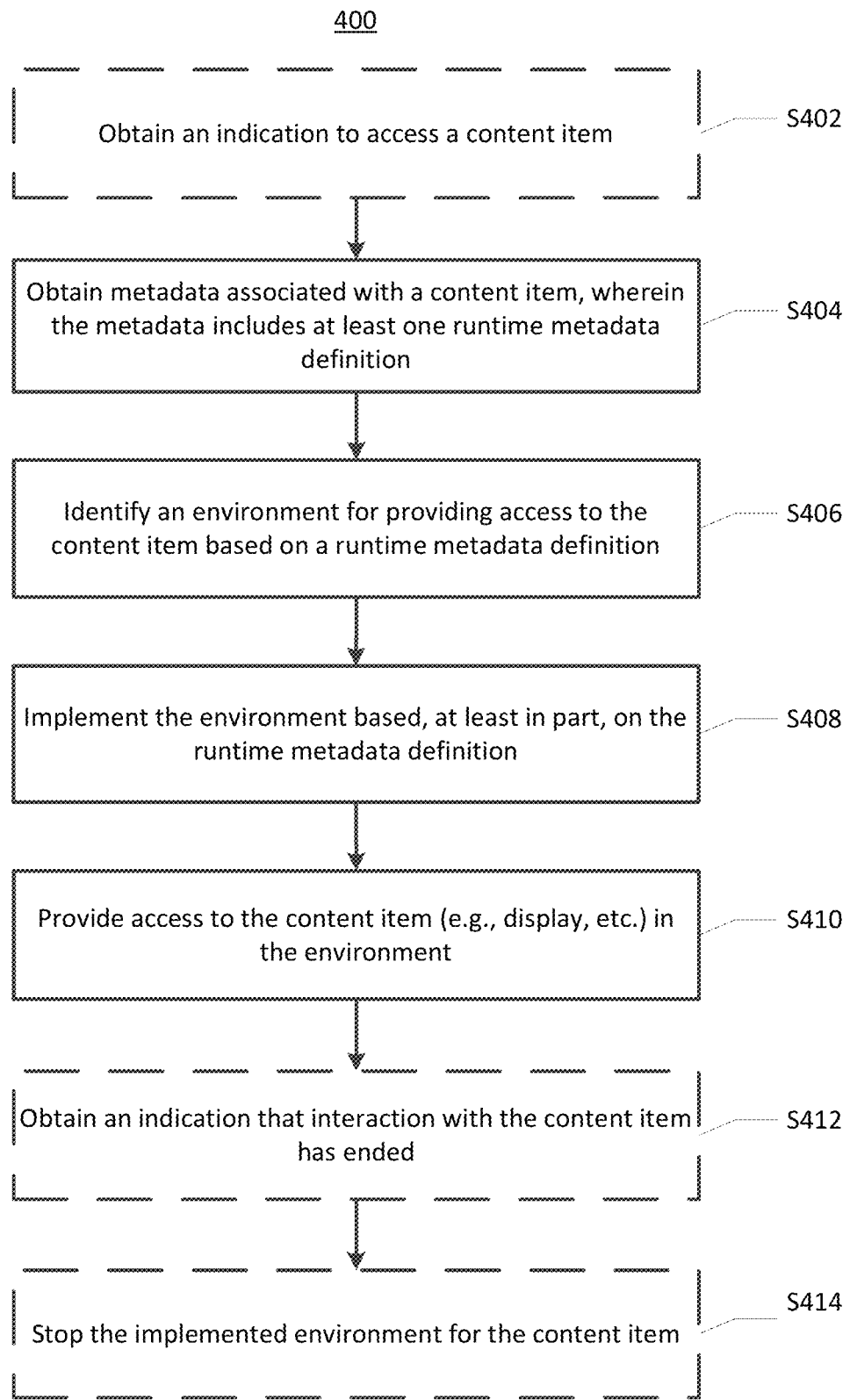
FIG. 4 depicts a flowchart showing a first embodiment method performed, at least in part, by the first embodiment system.
Figure 5:
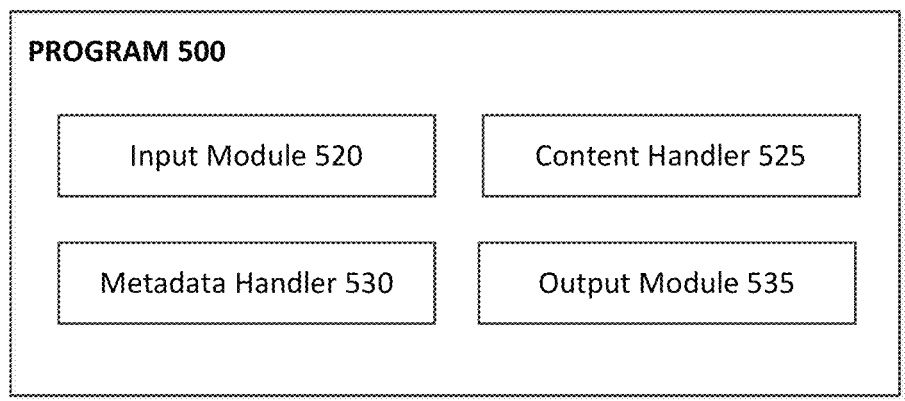
FIG. 5 depicts a block diagram showing an example machine logic (for example, software) portion of the first embodiment system.

FIG. 4 shows flowchart 400 depicting a computer-implemented method, according to embodiment(s) of the present invention. FIG. 5 shows a program 500 for performing at least some of the method operations of flowchart 400. Regarding FIG. 4, one or more flowchart blocks may be identified with dashed lines and represent optional steps that may additionally be included, but which are not necessarily required, in the depicted embodiments. This method and associated software will now be discussed, over the course of the following paragraphs, with extensive reference to FIG. 4 (for the method operation blocks) and FIG. 5 (for the software blocks).

As illustrated in FIG. 4, operations for deploying dynamic applications and/or infrastructure based on content metadata according to some embodiments of the present invention are provided in flowchart 400. In some embodiments, operations may optionally begin at operation S402, where a computing system (e.g., server computer 200 of FIG. 1 or the like) may obtain an indication to access a content item. As an example, in some embodiments, a user may provide a request to access content (e.g., display content item, etc.) to the computing system. For example, a user may be presented with link(s) to content and may select/click a link directed to the desired content, a user may provide request data identifying the desired content, and/or the like. As an example, an input module 520 of FIG. 5 and/or the like may provide for obtaining input data (e.g., from a user, etc.) identifying a request for content to be accessed, displayed, etc.

Processing proceeds to operation S404, where the computing system (e.g., server computer 200 of FIG. 1 or the like) obtains metadata associated with a content item (e.g., requested content, etc.). In some embodiments, for example, content metadata may be stored in one or more databases, data storage mechanisms, and/or the like and may be referenced using key(s) or other identifier(s) that link metadata (e.g., metadata objects, etc.) to a content item. The metadata can include at least one runtime metadata definition defining how the content can be executed at runtime (e.g., accessed, displayed, etc.). In some embodiments, content metadata may include multiple runtime metadata definitions where each application that may be used to access the content has an associated runtime metadata definition.

As an example, in some embodiments, a content handler 525 of FIG. 5 and/or the like may identify content (e.g., content item, etc.) that is requested for access (e.g., display, etc.). A metadata handler 530 and/or the like can provide for obtaining metadata for the content item, for example, via key(s) and/or other identifier(s) to reference the content metadata in a database, other data storage mechanism, and/or the like. In some embodiments, the metadata handler 530 and/or the like may provide for identifying which metadata to read (e.g., defined in the link to the content, provided by the link/user, etc.) for the deployment, such as a runtime metadata definition. The metadata handler 530 and/or the like can provide for reading the metadata for the content (e.g., runtime metadata definition, etc.) to facilitate implementing (e.g., instantiating, etc.) the underlying infrastructure and runtime application to be used with the content item.

In some embodiments, a runtime metadata definition may include data defining one or more on the infrastructure, applications, containers, security, databases, configuration, and/or the like (e.g., infrastructure metadata, application metadata, etc.). In some embodiments, the infrastructure metadata and application metadata (e.g., for a particular application, etc.) may be stored and referenced together (e.g., in a runtime metadata definition). In some embodiments, the application metadata may be stored and referenced separately from the infrastructure metadata, for example, where an infrastructure may be utilized by multiple applications.

Processing proceeds to operation S406, where the computing system (e.g., server computer 200 of FIG. 1 or the like) can identify an environment to provide access (e.g., display, etc.) for the content item based on a runtime metadata definition provided as metadata for the content item. For example, the computing system can read a runtime metadata definition provided in the metadata for the content and identify the runtime environment (e.g., infrastructure, runtime application(s), etc.) to be used to access (e.g., display, etc.) the content item. In some embodiments, for example, the computing system can identify infrastructure data, application data, and/or the like included in the runtime metadata definition to identify and build the runtime environment used with the content item. As an example, a metadata handler 530 and/or the like can provide for reading the metadata for the content (e.g., runtime metadata definition, etc.) to identify the runtime environment and facilitate implementing (e.g., instantiating, etc.) the underlying infrastructure and runtime application to be used with the content item.

Processing proceeds to operation S408, where the computing system (e.g., server computer 200 of FIG. 1 or the like) can implement the environment (e.g., runtime environment, etc.) based, at least in part, on the runtime metadata definition. In some embodiments, for example, the computing system can read the metadata of the content item (e.g., runtime metadata definition, etc.) and execute calls against a defined infrastructure to instantiate the underlying infrastructure and runtime application for the content item. As an example, the metadata handler 530, output module 535, and/or the like can facilitate implementing the environment, such as providing for instantiating the underlying infrastructure and runtime application to be used with the content item.

Processing proceeds to operation S410, where the computing system (e.g., server computer 200 of FIG. 1 or the like) can provide access to the content item in the implemented environment (e.g., runtime environment, etc.). For example, the computing system can provide access to the content item in the environment (e.g., using the instantiated infrastructure and runtime application, etc.) to present/display the content item, to allow for interaction with the content item, and/or the like. As an example, an output module 535 and/or the like can provide for presenting the content item to a user and/or interacting with the content, for example, using the runtime application.

Optionally, in some embodiments, processing may proceed to operation S412, where the computing system (e.g., server computer 200 of FIG. 1 or the like) may obtain an indication that interaction with the content item has ended. For example, in some embodiments, when a user has finished with the content (e.g., user interaction ends), the user may select to close the content item, and the computing system may be provided with an indication to close the content item.

Optionally, in some embodiments, processing may proceed to operation S414, where the computing system (e.g., server computer 200 of FIG. 1 or the like) may stop (e.g., decommission, etc.) the implemented environment for the content item. In some embodiments, for example, the computing system may stop or decommission the runtime environment. As an example, when content interaction is completed, the infrastructure, runtime application(s), and content may be dematerialized, the infrastructure may be deallocated, and the runtime application(s) may be stopped. Alternatively, in some embodiments, the environment (e.g., runtime environment, etc.) may be preserved for a defined time period to allow for use in case new interactions are requested for the content item. In such embodiments, the environment may be stopped or decommissioned after the defined time period has elapsed.

Further Comments and/or Embodiments

Figure 6:
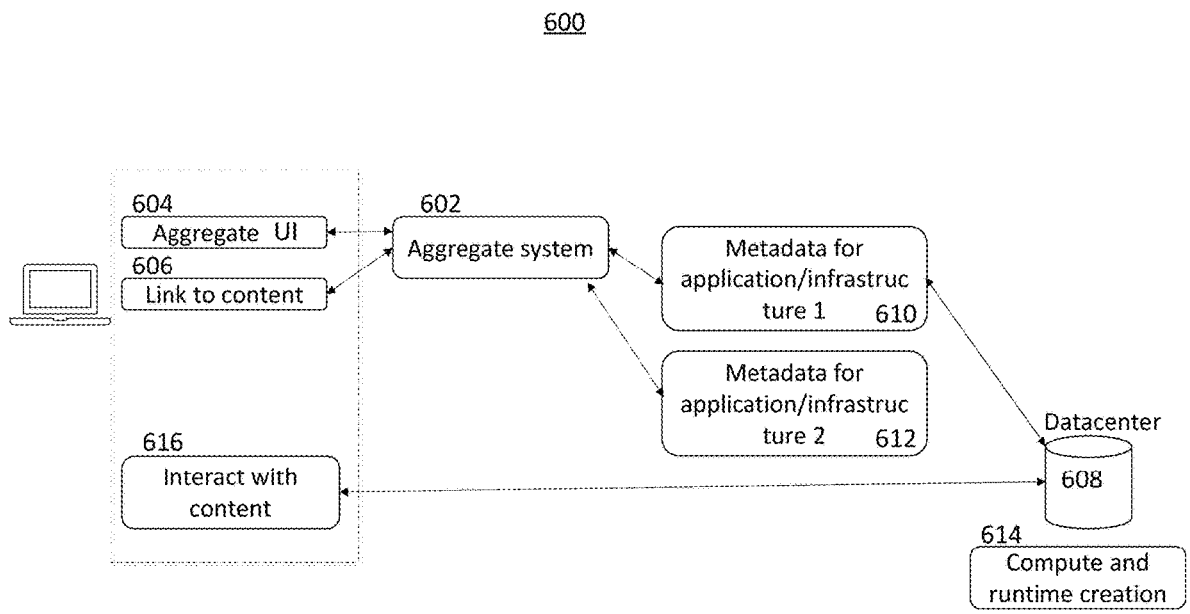
FIG. 6 depicts a block diagram of an example system architecture for deployment of applications and infrastructure based on content metadata, according to embodiments of the present invention.

FIG. 6 depicts a block diagram of an example system architecture 600 for deployment of applications and infrastructure based on content metadata, according to embodiments of the present invention. As illustrated in FIG. 6, system architecture 600 may include an aggregating system 602. The aggregating system 602 may facilitate access for (e.g., present, display, etc.) content items. For example, the aggregating system 602 may provide links to content that may be requested. As an example, in some embodiments, the aggregating system 602 may communicate and/or be associated with a local application that allows for display of content requested through the aggregating system 602 once instantiated. A user may interact with a link to content 606 (e.g., select link, request a content item, etc.) through an aggregate portal and/or user interface (UI) 604, through a link to content 606 provided in a message (e.g., email message, other messaging platform message, etc.), and/or the like.

The aggregating system 602 may receive an indication requesting access to a content item, for example, in response to a user selecting, clicking, and/or otherwise executing a link to content 606 associated with a desired content item. In response, the aggregating system 602 may obtain and read metadata for the content item including a runtime metadata definition provided in the content metadata. In some embodiments, a link to content 606 may define which infrastructure/application metadata (e.g., runtime metadata definition, etc.) to obtain and read from the content metadata to facilitate access. In some embodiments, a user may provide (e.g., via an aggregate portal/UI 604 and link to content 606, etc.) data for determining which infrastructure/application metadata (e.g., runtime metadata definition, etc.) to obtain and read from the content metadata to facilitate access. For example, content metadata for content associated with a link to content 606 may include one or more metadata objects, such as metadata object 610, metadata object 612, etc., representing runtime metadata definitions that define the runtime environment (e.g., infrastructure, application(s), etc.) to deploy for the content item. In some embodiments, the metadata for content items may be stored using one or more databases, other data storage mechanisms, and/or the like, for example, provided by datacenter 608.

The aggregating system 602 may execute calls against a defined infrastructure (e.g., based on the runtime metadata definition in the content metadata) to instantiate the underlying infrastructure and runtime application 614 to be used with the content. In response to provisioning of the runtime environment (e.g., infrastructure, runtime application, etc.), the content item can be provided for user interaction, for example, as content item interaction 616. In some embodiments, the content item can be presented (e.g., displayed, etc.) using an aggregate portal/UI 604 and/or the like.

Figure 7:
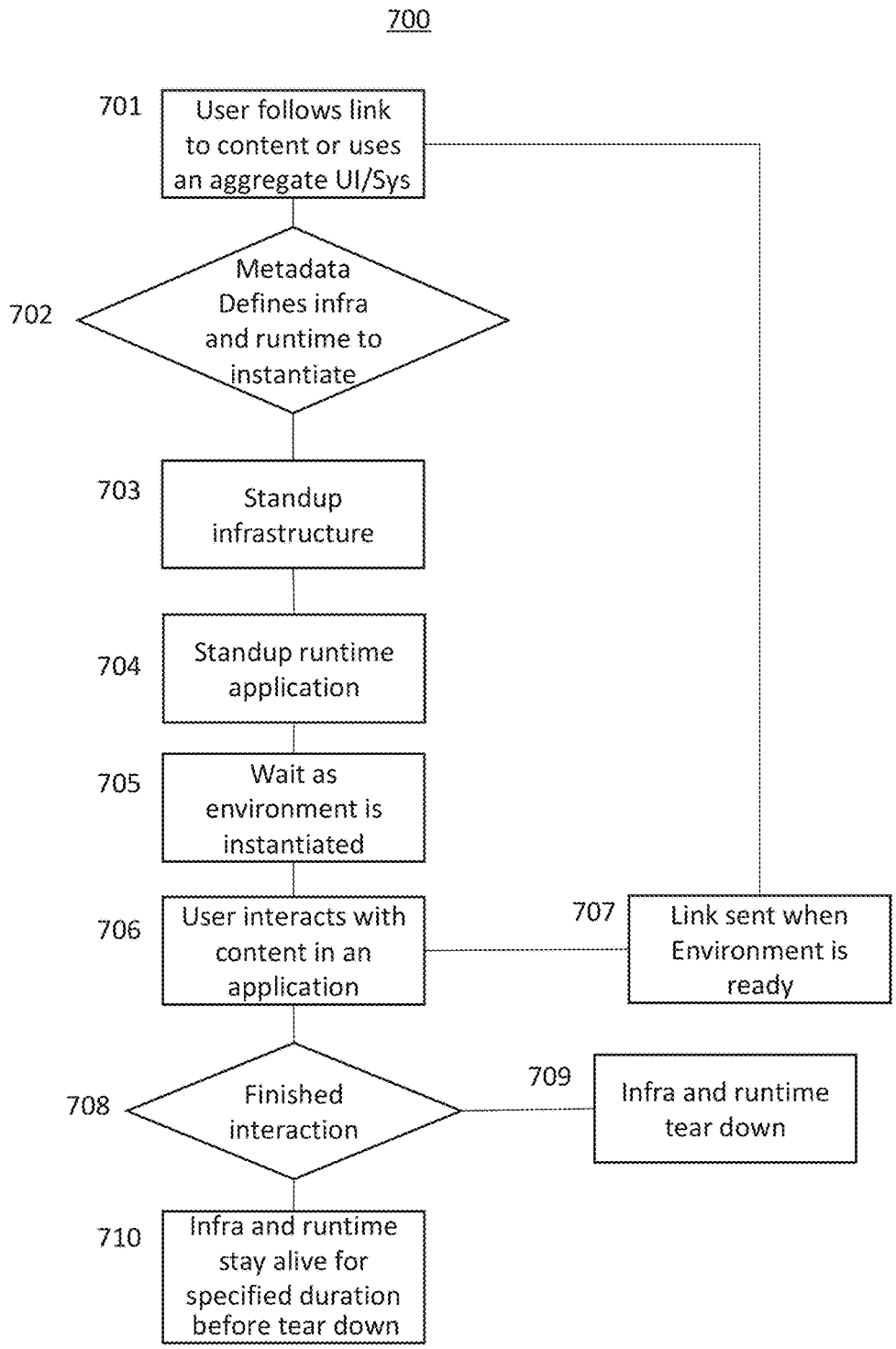
FIG. 7 depicts a system flow diagram for deployment of applications and infrastructure based on content metadata, according to embodiments of the present invention.

FIG. 7 depicts a system flow diagram 700 for deployment of applications and infrastructure based on content metadata, according to embodiments of the present invention. As illustrated in FIG. 7, a link to content can be provided to a user (e.g., to request access to the content, etc.), for example, by an aggregating system, aggregate portal/UI, and/or the like. As an example, an aggregating system may communicate and/be associated with a local system application that can provide (e.g., display, etc.) the content item once instantiated. At 701, the user can request the content item, for example, by selecting, clicking, or otherwise following the link.

At 702, a computing system can obtain and read content metadata associated with the content item that defines the infrastructure, runtime application(s), and/or the like for deploying a runtime environment for the content item. In some embodiments, the infrastructure/application metadata (e.g., runtime metadata definition, etc.) to be read from the content metadata can be defined by data provided in the link, can be obtained via the link (e.g., from the user), and/or the like. Some embodiments can provide for a user to interface with the link to the content directly through an aggregate portal/UI, via a link in an email message, and/or the like.

In response to execution of the link to the content and reading of the content metadata, the computing system can execute calls to instantiate the infrastructure at 703 and to instantiate the runtime application at 704 to provision the runtime environment to be used with the content item.

At 705, the user can wait, either in the aggregate portal/UI window or after clicking the link in a message, for the runtime environment to be provisioned. At 706, the content item can be provided with access to the content item, for example via an aggregate portal/UI window, other display window, and/or the like. The content item can be provided (e.g., displayed, etc.) such that the user can interact with the content. In some embodiments, a user may be provided with an option to not actively wait for the environment to be provisioned for the content item. In such embodiments, when the environment is provisioned and the content is ready for user interaction, a portal/UI window can be redirected, a message can be provided to the user, and or the like at 707. The content can then be provided at 706.

At 708, when a user is finished with the content, the content and runtime environment can be indicated for decommission. At 709, the content and runtime environment can be decommissioned in response to an indication that content interaction is finished. For example, in some embodiments, the environment can be decommissioned stopping and/or deallocating the runtime application and infrastructure. In some embodiments, the infrastructure can be spun down and decommissioned to stop incurring charges for the infrastructure/resources. Alternatively, at 710, the environment (e.g., infrastructure, runtime application, etc.) can be preserved for a specified duration before the environment is decommissioned. For example, the environment (e.g., infrastructure, runtime application, etc.) may be kept alive for some period in case new interactions are requested for the content, such that the environment for the content is not taken down and then rebuilt within a short period.

Figure 8:
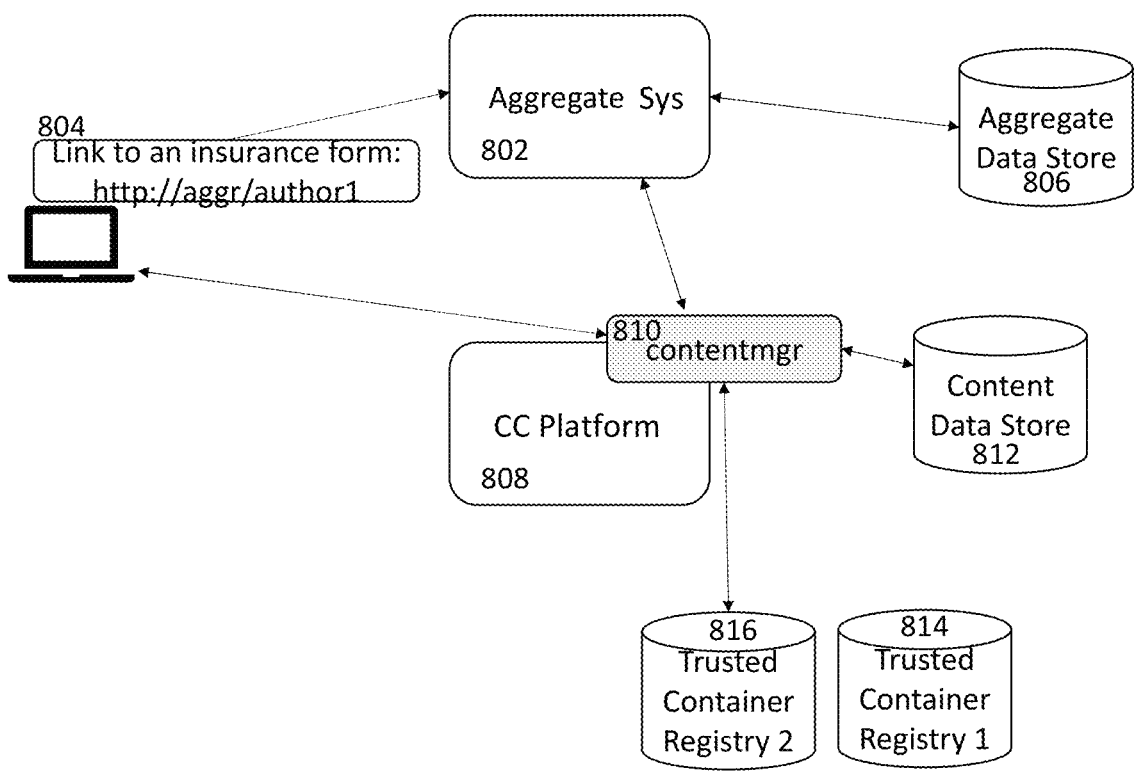
FIG. 8 depicts a block diagram of an example content manager application system architecture for deployment of infrastructure based on content metadata, according to embodiments of the present invention.

FIG. 8 depicts a block diagram of an example system architecture 800 for deployment of infrastructure and a content manager application based on content metadata, according to embodiments of the present invention. As illustrated in FIG. 8, an aggregating system 802 can receive an indication of a request for a content item, for example, following execution of a link 804 for the content. The aggregating system 802 can read metadata for the content item (e.g., an identified runtime metadata definition, etc.), for example from an aggregate data store 806, based on data defined by or in association with the content link 804. An example runtime metadata definition for using a content manager application to access the content may be defined as:

```
{
    content:
        contentstore: contentstoreapp1
        contentlocation: contentlocation 1
    author1:
        container: contentapp1
        tag: v1.5.5
        repo: trusted reg 2
        runtime: Cloud Vendor1
    viewer:
        container:contentviewapp1
        tag: v2.1.3
        repo: trusted reg1
        runtime: CloudVendor2
}
```

The aggregating system 802 can provide for instantiation of infrastructure and runtime application (e.g., runtime environment, etc.), for access to the content, for example via a cloud computing platform 808, based on the content metadata (e.g., runtime metadata definition, etc.). For example, a runtime environment can be provisioned to provide a content manager application 810 to be used for the content associated with content link 804. The content manager application 810 may access a content store 812 and a trusted container registry, such as trusted container registries 814 or 816, (e.g., trusted container registry 2/registry 816) to provide access to the requested content item.

Figure 9:
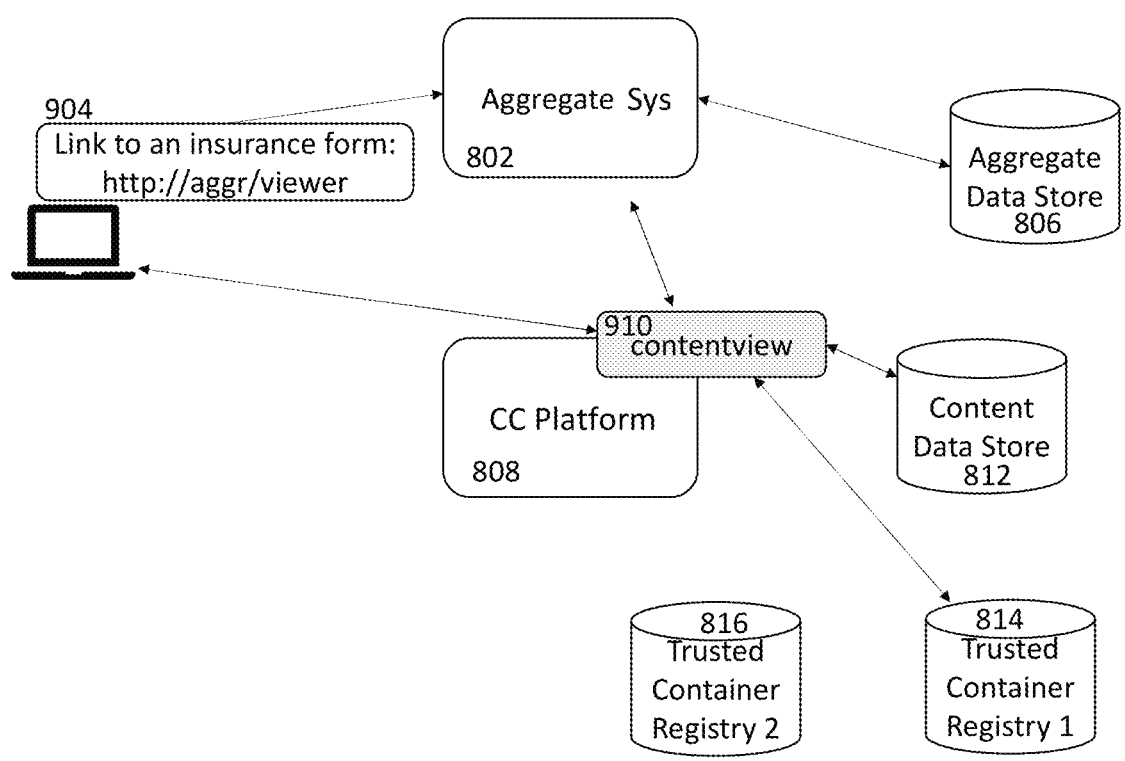
FIG. 9 depicts a block diagram of an example view application system architecture for deployment of infrastructure based on content metadata, according to embodiments of the present invention.

FIG. 9 depicts a block diagram of an example system architecture 900 for deployment of infrastructure and runtime application based on content metadata, according to embodiments of the present invention. As illustrated in FIG. 9, an aggregating system 802 can receive an indication of a request for a content item, for example, following execution of a link 904 for the content. The aggregating system 802 can read metadata for the content item (e.g., an identified runtime metadata definition, etc.), for example from an aggregate data store 806, based on data defined by or in association with the content link 904. An example runtime metadata definition for using a view application to access the content may be defined as:

```
{
    content:
        contentstore: contentstoreapp1
        contentlocation: contentlocation1
    author1:
        container: contentappcontainer
        tag: v1.5.5
        repo: trusted reg 2
        runtime: cloudcomputingplatformB
    viewer:
        container:contentviewappcontainer
        tag: v2.1.3
        repo: trusted reg 1
        runtime: Cloud Vendor A
}
```

The aggregating system 802 can provide for instantiation of infrastructure and runtime application (e.g., runtime environment, etc.), for access to the content, for example via a cloud computing platform 808, based on the content metadata (e.g., runtime metadata definition, etc.). For example, a runtime environment can be provisioned to provide a view application 910 to be used for the content associated with content link 904. The view application 910 may access a content store 812 and a trusted container registry, such as trusted container registry 814, (e.g., trusted container registry 1) to provide access to the requested content item.

Figure 10:
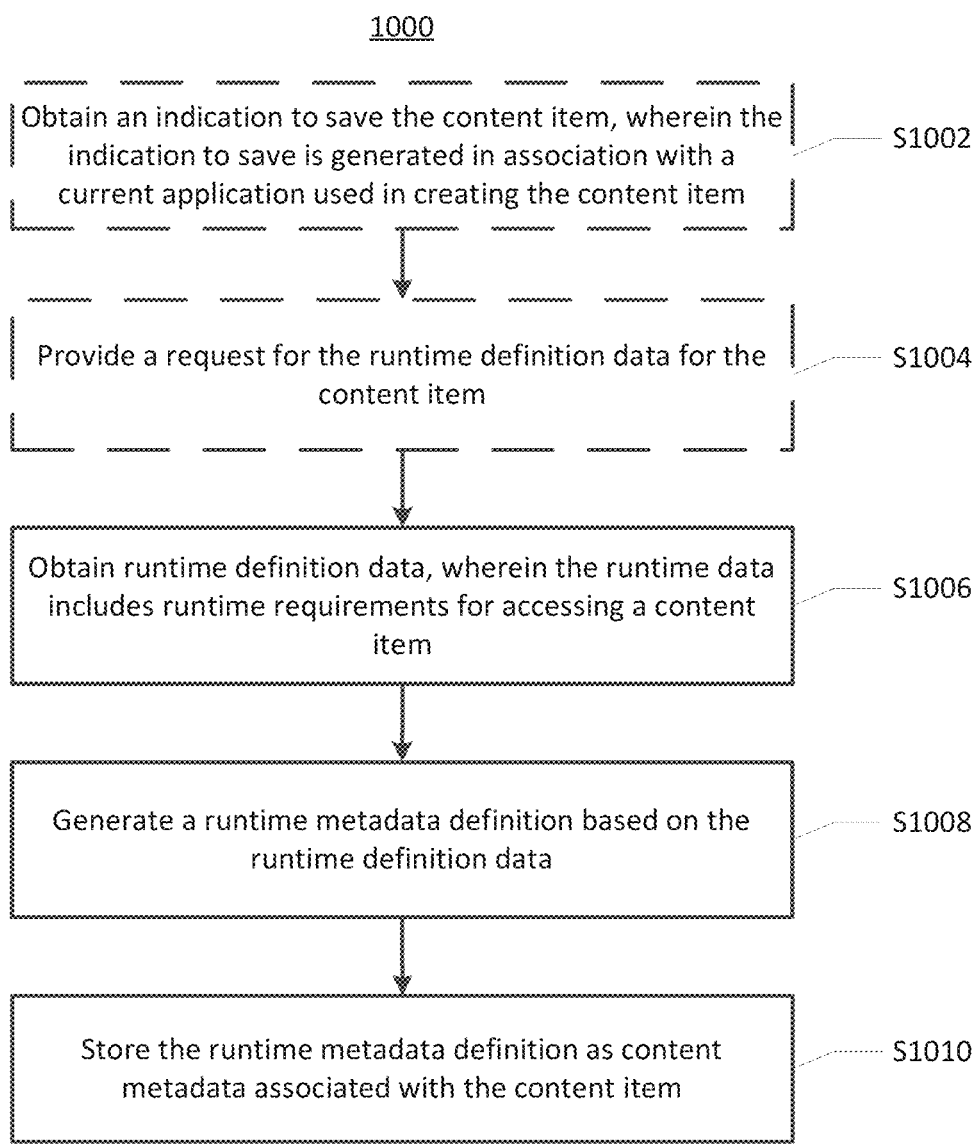
FIG. 10 depicts a flowchart showing example operations for generating and/or modifying infrastructure and runtime data for content, according to embodiments of the present invention.

FIG. 10 depicts a flowchart 1000 showing example operations for generating and/or modifying infrastructure and runtime data for content, according to embodiments of the present invention. As illustrated in FIG. 10, operations for generating infrastructure and runtime data for content to be stored as content metadata according to some embodiments of the present invention are provided in flowchart 1000. In some embodiments, operations may optionally begin at operation S1002, where a computing system (e.g., server computer 200 of FIG. 1 or the like) may obtain an indication to save the content item, wherein the indication to save is generated in association with a current application used in creating the content item. As an example, in some embodiments, a user may create, edit, or otherwise work with content (e.g., a content item, etc.), for example, using a standard application, a content aggregator, and/or the like. In some embodiments, the user may provide an indication to save the content item they are working on (e.g., select a save option, etc.), select an option to define runtime definition data for the content item, and/or the like.

Optionally, in some embodiments, processing may proceed to operation S1004, where the computing system (e.g., server computer 200 of FIG. 1 or the like) may provide a request for the runtime definition data for the content item. In some embodiments, the computing system may provide a UI to request and allow for defining the runtime definition data and generating a runtime metadata definition separate from and/or in addition to the application used in creating, editing, and/or otherwise working with the content item (e.g., the current application, etc.).

Processing proceeds to operation S1006, where the computing system (e.g., server computer 200 of FIG. 1 or the like) obtains runtime definition data, wherein the runtime data includes runtime requirements for accessing a content item.

In some embodiments, runtime definition data associated with the current application (e.g., used in creating/editing/working with the content item, etc.) can be provided as default runtime definition data to be used in generating the runtime metadata definition for the content item. The runtime definition data associated with the current application can include infrastructure data and/or other runtime data for the current application (e.g., data associated with the infrastructure, application(s), container(s), security, databases(s), configuration, etc. for the current application).

In some embodiments, one or more options for runtime definition data may be defined and provided for selection (e.g., via a user interface, etc.) in defining the runtime definition data to be used in generating the runtime metadata definition (e.g., translated into metadata defining a runtime environment that can provide access to the content item, etc.). In some embodiments, the computing system (e.g., via a user interface, etc.) may allow for providing customized definition data for the custom runtime definition data to be used in generating the runtime metadata definition (e.g., in addition to or as an alternative to default runtime definition data, defined options for runtime definition data, etc.).

Processing proceeds to operation S1008, where the computing system (e.g., server computer 200 of FIG. 1 or the like) generates a runtime metadata definition based on the runtime definition data. The runtime metadata definition can include data defining the infrastructure, applications, containers, security, databases, configuration information, any other information, and/or the like to be used in provisioning a runtime environment to access (e.g., provide, display, etc.) the content item.

Processing proceeds to operation S1010, where the computing system (e.g., server computer 200 of FIG. 1 or the like) stores the runtime metadata definition as content metadata associated with the content item. In some embodiments, the metadata can be stored in an aggregate data store and/or the like and associated with the content item, for example, via one or more keys and/or other identifiers.

In some embodiments, multiple runtime metadata definitions can be generated and stored as content metadata. Each runtime metadata definition can be associated with a particular runtime environment (e.g., runtime application, etc.) to be provisioned to provide access (e.g., display, present, etc.) the content item. In such embodiments, the computing system (e.g., via a user interface, etc.) can allow for obtain runtime definition data for each runtime metadata definition to be generated and stored as metadata for the content item.

In some embodiments, the computing system can provide for "publishing" the content item to some other runtime environment different from the current application. For example, if a rich text editor and/or the like is used to create and/or edit the content item, the content item may be "published" to a website infrastructure by creating a runtime metadata definition for the website infrastructure and storing it as metadata for the content item. In such embodiments, the computing system may allow for obtaining an indication to publish the content item (e.g., user selection/request via a user interface, etc.). In response to obtaining a request to publish the content item to a different runtime environment (e.g., different runtime application, etc.) from the current application, the computing system can request and provide for obtaining runtime definition data associated with the different runtime environment (e.g., different runtime application, etc.). The computing system can use the obtained runtime definition data associated with the different runtime environment (e.g., different runtime application, etc.) to generate a runtime metadata definition for the different runtime environment and store it as metadata associated with the content item. In some embodiments, the metadata for the publish environment can be stored in an aggregate data store and/or the like and associated with the content item, for example, via one or more keys and/or other identifiers.

In some embodiments, the metadata for the content (e.g., runtime metadata definitions, etc.) can be managed at various levels using one or more policies or configurations. For example, in some embodiments, a policy may be defined and implemented to govern metadata for the runtime environment(s). In an example, a policy may be used to manage metadata associated with infrastructure, such as when an organization implements a change from one infrastructure to another infrastructure.

Figure 11:
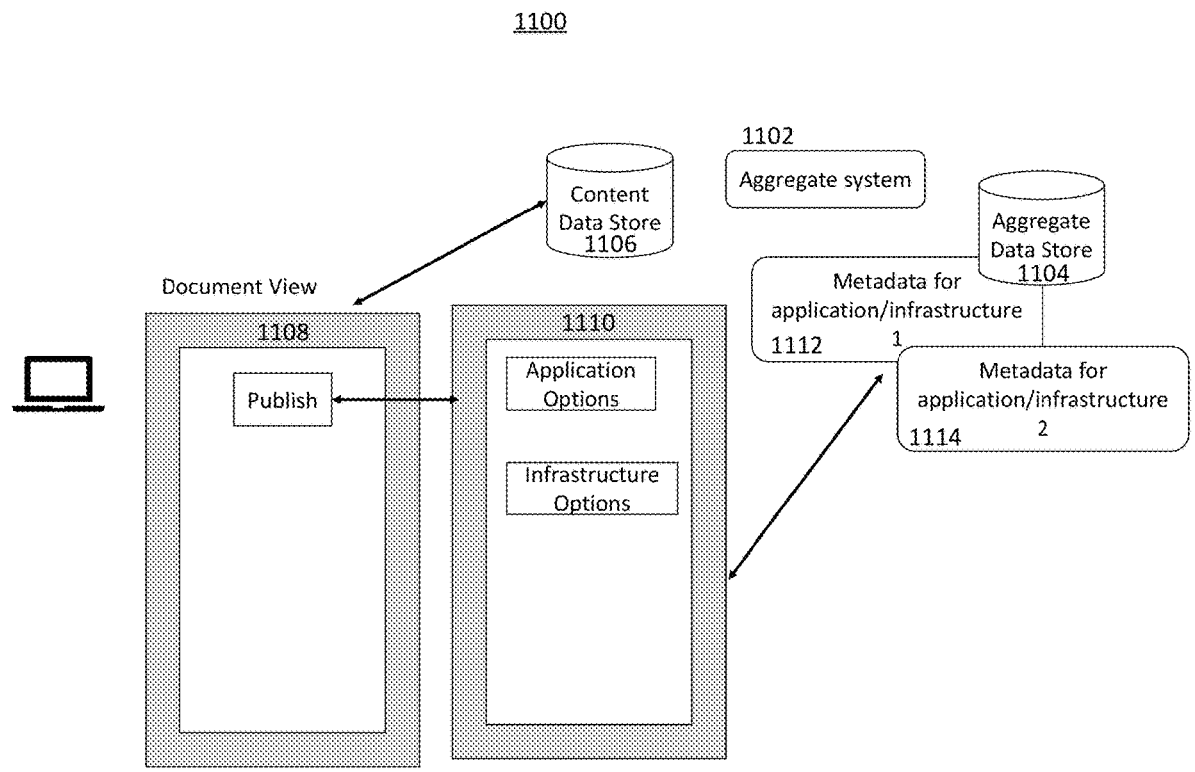
FIG. 11 depicts a block diagram of an example system architecture for generating and/or modifying infrastructure and runtime data for content, according to embodiments of the present invention.

FIG. 11 depicts a block diagram of an example system architecture 1100 for generating and/or modifying infrastructure and runtime data for content, according to embodiments of the present invention. As illustrated in FIG. 11, a system architecture 1100 can include an aggregator system 1102, an aggregate data store 1104, a content data store 1106, and a content interface 1108.

A user may create, edit, or otherwise work with a content item via the content application which may provide a content interface 1108 (e.g., document view) to view and/or work with a content item. In some embodiments, a content aggregator (e.g., aggregator system 1102, etc.) can provide for viewing a content via content interface 1108 (e.g., document view). The content item(s) can be stored using a content data store 1106 and content items can be retrieved from the content data store 1106 to provide for working with the content item via content interface 1108. A user can provide an indication that a content item being created, edited, and/or otherwise worked should be saved (e.g., via content interface 1108, etc.) and/or can provide an indication that a runtime environment should be defined for the content item (e.g., via selection of an icon, menu option, etc. via an application interface, content interface 1108, etc.).

The aggregator system 1102 can generate a runtime definition interface, such as runtime definition interface 1110 and/or the like to provide for obtaining runtime application data and infrastructure data (e.g., runtime definition data, etc.) that can be used define an environment to access (e.g., display, etc.) the content item. For example, runtime definition interface 1110 can provide for obtaining runtime application options, infrastructure options, and/or the like for the content item. The runtime application data, infrastructure data, and/or the like (e.g., runtime definition data, etc.) can be translated into metadata information for definition of infrastructure, application runtime, and/or the like (e.g., runtime environment, etc.).

In some embodiments, the aggregator system 1102 may provide for presenting multiple selection options for the runtime application data, infrastructure data, and/or the like (e.g., runtime definition data, etc.), for example via a runtime definition interface 1110 and/or the like. In some embodiments, the aggregator system 1102 may provide default options for the runtime application data, infrastructure data, and/or the like (e.g., runtime definition data, etc.) based on a current application being used to work with the content item. In some embodiments, the aggregator system 1102 may provide for defining custom configurations for the runtime application data, infrastructure data, and/or the like (e.g., runtime definition data, etc.).

In some embodiments, the aggregator system 1102 can provide for generating a runtime metadata definition (e.g., runtime application data, infrastructure data, etc.) to allow for publishing the content item to another runtime environment (e.g., different from the current application, infrastructure, etc. used to work with the content item). For example, the aggregator system 1102 can provide for generating a publish runtime definition interface and/or the like to provide for obtaining runtime application data, infrastructure data, and/or the like (e.g., runtime definition data, etc.) that define a publish runtime environment for the content item.

The aggregator system 1102 can provide for generating a runtime metadata definition for the content item based on the runtime application data, infrastructure data, and/or the like (e.g., runtime definition data, etc.). In some embodiments, the aggregator system 1102 can provide for generating multiple runtime metadata definitions for a content item, for example, where each runtime metadata definition can define a different application/infrastructure (e.g., runtime environment, etc.) for accessing a content item.

The aggregator system 1102 can provide for storing the runtime metadata definition(s) as content metadata associated with the content item, such as metadata 1112 for application/infrastructure 1, metadata 1114 for application/infrastructure 2, and/or the like. The content metadata (e.g., metadata 1112 for application/infrastructure 1, metadata 1114 for application/infrastructure 2, etc.) can be stored in an aggregate data store 1104 and/or the like and can be associated with the content item (e.g., referenced via key(s), other identifier(s), etc.).

The content metadata for an identified runtime environment (e.g., metadata 1112 for application/infrastructure 1, metadata 1114 for application/infrastructure 2, etc.) can be read from aggregate data store 1104 and/or the like to be used to deploy/provision a runtime environment (e.g., infrastructure, runtime application(s), etc.) for a requested content item, such as described in further detail herein.

Figure 12:
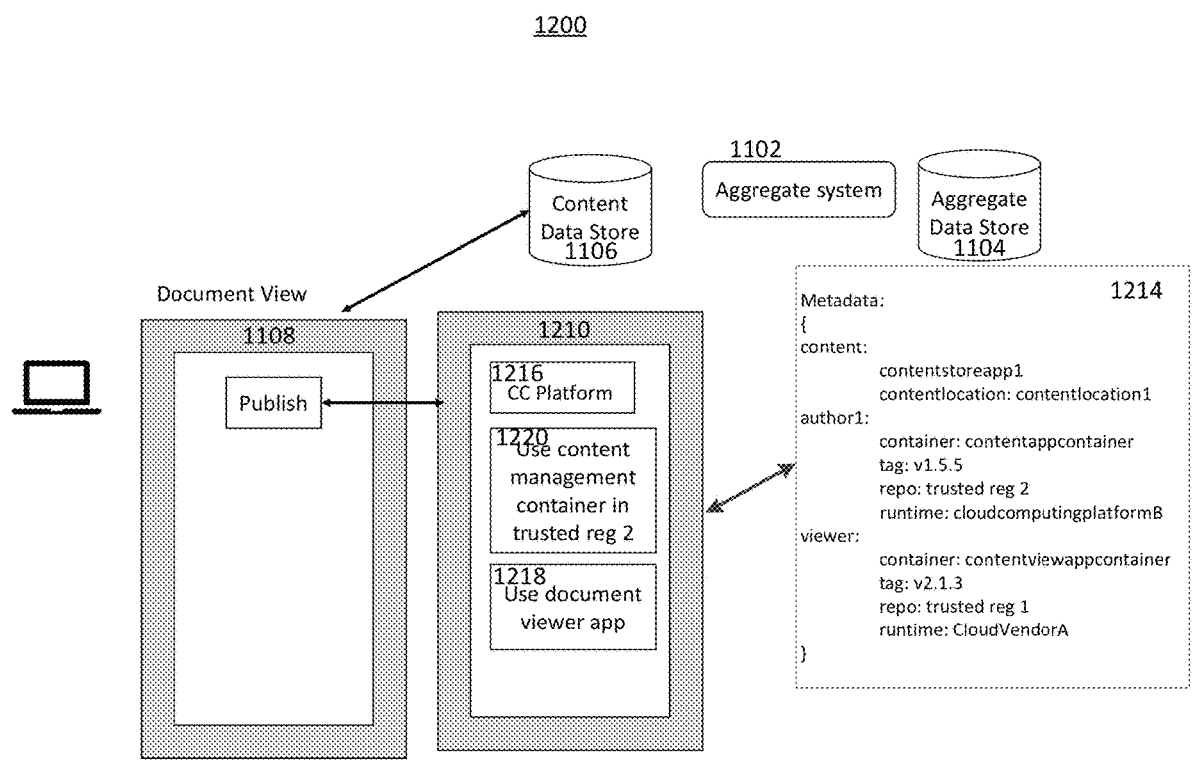
FIG. 12 depicts a block diagram of an example instance of generating infrastructure and runtime data for content, according to embodiments of the present invention.

FIG. 12 depicts a block diagram of an example instance 1200 generating infrastructure and runtime data for content, according to embodiments of the present invention. As illustrated in FIG. 12, a system architecture can include an aggregator system 1102, an aggregate data store 1104, a content data store 1106, and a content interface 1108 and can operate in a fashion similar to that described with regard to FIG. 11. A runtime definition interface, such as runtime definition interface 1210, can provide for displaying a identified runtime metadata definition (e.g., runtime application data, infrastructure data, etc.) for a content item, for example, based on content metadata such as content metadata 1214, that may be stored in aggregate data store 1104 and/or the like. As illustrated in FIG. 12, runtime definition interface 1210 can display defined runtime environment data such as cloud computing platform 1216 (e.g., infrastructure, etc.), runtime application 1218, associated runtime data 1220, and/or the like.

As an example, a runtime metadata definition of content metadata 1214 may be provided as:

```
{
content:
   contentstore: contentstoreapp1
   contentlocation: contentlocation1
author1:
   container: contentappcontainer
   tag: v1.5.5
   repo: trusted reg 2
   runtime: cloudcomputingplatfromB
viewer:
   container:contentviewappcontainer
   tag: v2.1.3
```

-continued

```
   repo: trusted reg 1
   runtime: Cloud Vendor A
}
```

Figure 13:
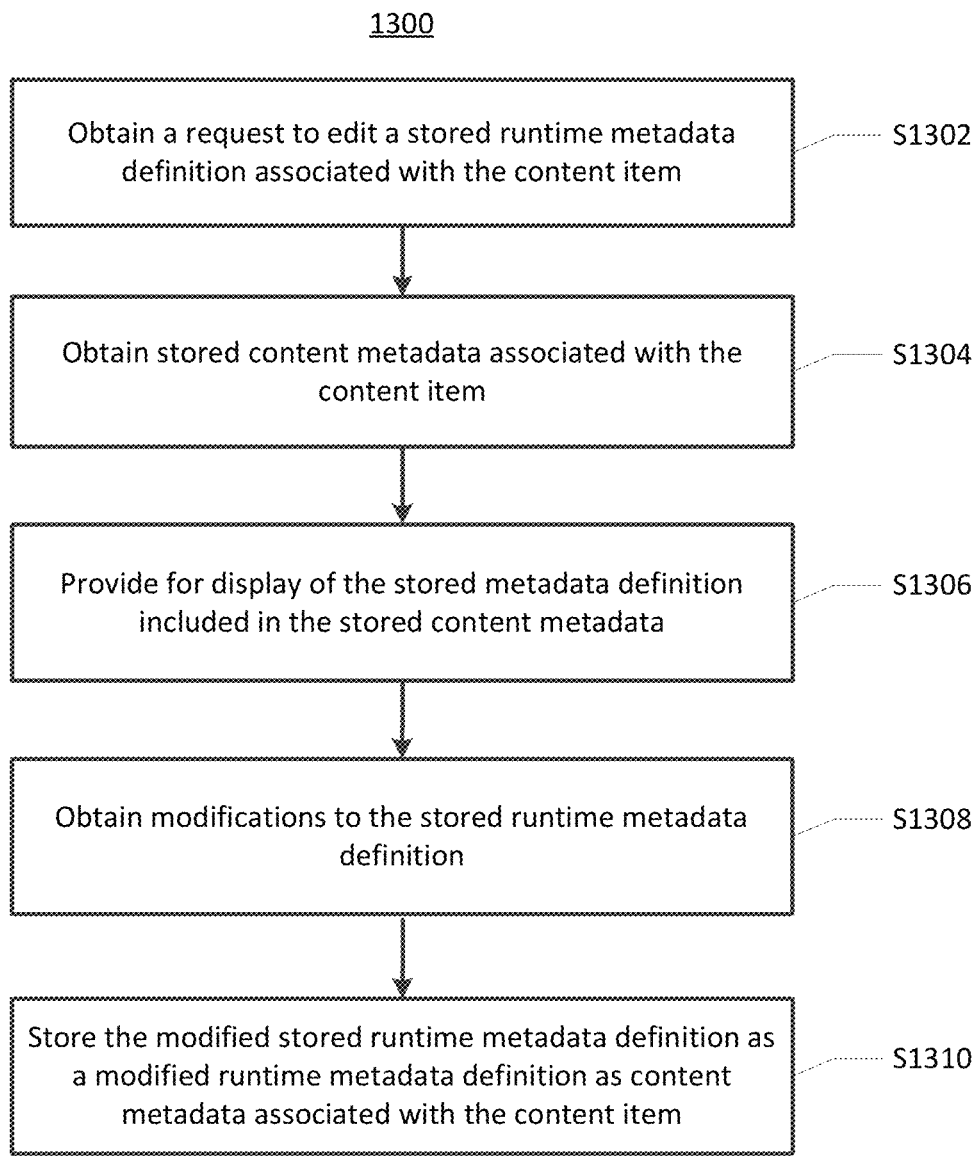
FIG. 13 depicts a flowchart showing example operations for modifying infrastructure and runtime data for content, according to embodiments of the present invention.

FIG. 13 depicts a flowchart 1300 showing example operations for editing and/or modifying infrastructure and runtime data for content, according to embodiments of the present invention. As illustrated in FIG. 13, in some embodiments, operations for modifying infrastructure data, runtime data, and/or the like (e.g., a stored runtime metadata definition, etc.) stored as content metadata for a content item can begin at operation S1302, where a computing system (e.g., server computer 200 of FIG. 1 or the like) can obtain a request to edit a stored runtime metadata definition associated with the content item.

Processing proceeds to operation S1304, where the computing system (e.g., server computer 200 of FIG. 1 or the like) can obtain stored content metadata associated with the content item, for example, from a metadata data store and/or the like.

Processing proceeds to operation S1306, where the computing system (e.g., server computer 200 of FIG. 1 or the like) can provide for display of a stored runtime metadata definition included in the stored content metadata obtained. For example, the computing system can provide a runtime definition interface and/or the like to provide and/or display the stored runtime metadata definition.

Processing proceeds to operation S1308, where the computing system (e.g., server computer 200 of FIG. 1 or the like) can obtain modifications to the stored runtime metadata definition. For example, the computing system can provide a runtime definition interface and/or the like to allow for editing and/or otherwise modifying one or more items defined in the stored runtime metadata definition.

Processing proceeds to operation S1310, where the computing system (e.g., server computer 200 of FIG. 1 or the like) can store the modified stored runtime metadata definition as a modified runtime metadata definition in content metadata associated with the content item. In some embodiments, the modified runtime metadata definition can be stored as a new runtime metadata definition with associated versioning information for the metadata. Additionally, one or more prior versions of the metadata including prior versions of the runtime metadata definition(s) can be maintained and stored along with the new runtime metadata definition (e.g., modified runtime metadata definition, etc.). Maintaining instances of prior versioned metadata can allow for rolling back to a prior stored version of the metadata, for example, if a new (e.g., modified) runtime metadata definition is determined to not be suitable for the content item.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar caution applies to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   receiving, at a computer, metadata associated with a content item, wherein the metadata includes a runtime metadata definition;
   determining, using the computer, which environment to implement for providing access to the content item based on the runtime metadata definition, the runtime metadata definition including information for a run time environment, the content item being accessed/displayed by as many applications as desired by providing multiple runtime metadata definitions;
   implementing an environment based, at least in part, on the runtime metadata definition which includes the information for the run time environment;
   providing access to the content item in the environment;
   storing as a metadata object metadata specific to each runtime metadata definition for a content item;
   each of the metadata objects including a key/identifier to a parent metadata for the content item; and
   each of the content items having one or more runtime metadata definitions associated with each of the content items defining how the content will be executed at runtime.

2. The computer-implemented method of claim 1, wherein the metadata associated with the content item is obtained in response to obtaining an indication to access the content item.

3. The computer-implemented method of claim 1, further comprising:
   obtaining an indication that interaction with the content item has ended; and
   stopping the implemented environment for the content item.

4. The computer-implemented method of claim 1, wherein the runtime metadata definition includes infrastructure metadata defining an infrastructure for providing the content item.

5. The computer-implemented method of claim 1, wherein the runtime metadata definition includes application metadata defining application specific data for the content item.

6. The computer-implemented method of claim 1, wherein determining which environment to implement for providing access to the content item comprises identifying infrastructure data included in the runtime metadata definition.

7. The computer-implemented method of claim 1, wherein determining which environment to implement for providing access to the content item comprises identifying application data included in the runtime metadata definition.

8. The computer-implemented method of claim 1, wherein implementing the environment for the content item comprises instantiating an infrastructure for accessing the content item.

9. The computer-implemented method of claim 1, wherein implementing the environment for the content item comprises instantiating a runtime application for accessing the content item.

10. A computer program product comprising a computer readable storage medium having stored thereon:
    program instructions programmed to receive metadata associated with a content item, wherein the metadata includes a runtime metadata definition;
    program instructions programmed to determine which environment to implement for providing access to the content item based on the runtime metadata definition, the runtime metadata definition including information for a run time environment, the content item being accessed/displayed by as many applications as desired by providing multiple runtime metadata definitions;
    program instructions programmed to implement an environment based, at least in part, on the runtime metadata definition which includes the information for the run time environment;
    program instructions programmed to provide access to the content item in the environment;
    program instructions programmed to store as a metadata object metadata specific to each runtime metadata definition for a content item;
    wherein each of the metadata objects include a key/identifier to a parent metadata for the content item; and
    wherein each of the content items has one or more runtime metadata definitions associated with each of the content items defining how the content will be executed at runtime.

11. The computer program product of claim 10, wherein the metadata associated with the content item is obtained in response to obtaining an indication to access the content item.

12. The computer program product of claim 10, the computer readable storage medium having further stored thereon:
    program instructions programmed to obtain an indication that interaction with the content item has ended; and program instructions programmed to stop the implemented environment for the content item.

13. The computer program product of claim 10, wherein the runtime metadata definition includes infrastructure metadata defining an infrastructure for providing the content item.

14. The computer program product of claim 10, wherein the runtime metadata definition includes application metadata defining application specific data for the content item.

15. The computer program product of claim 10, wherein determining which environment to implement for providing access to the content item comprises identifying infrastructure data included in the runtime metadata definition and identifying application data included in the runtime metadata definition.

16. The computer program product of claim 11, wherein implementing the environment for the content item comprises instantiating an infrastructure for accessing the content item and instantiating a runtime application for accessing the content item.

17. A computer system comprising:
a processor set; and
a computer readable storage medium;
wherein:
the processor set is structured, located, connected and programmed to run program instructions stored on the computer readable storage medium; and
the stored program instructions include:
program instructions programmed to receive metadata associated with a content item, wherein the metadata includes a runtime metadata definition;
program instructions programmed to determine which environment to implement for providing access to the content item based on the runtime metadata definition, the runtime metadata definition including information for a run time environment, the content item being accessed/displayed by as many applications as desired by providing multiple runtime metadata definitions;
program instructions programmed to implement an environment based, at least in part, on the runtime metadata definition which includes the information for the run time environment;
program instructions programmed to provide access to the content item in the environment;
program instructions programmed to store as a metadata object metadata specific to each runtime metadata definition for a content item;
program instructions programmed such that each of the metadata objects includes a key/identifier to a parent metadata for the content item; and
program instructions programmed such that each of the content items has one or more runtime metadata definitions associated with each of the content items defining how the content will be executed at runtime.

18. The computer system of claim 17, wherein the metadata associated with the content item is obtained in response to obtaining an indication to access the content item.

19. The computer system of claim 17, wherein the stored program instructions further include:
program instructions programmed to obtain an indication that interaction with the content item has ended; and
program instructions programmed to stop the implemented environment for the content item.

20. The computer system of claim 17, wherein the runtime metadata definition includes infrastructure metadata defining an infrastructure for providing the content item and application metadata defining application specific data for the content item.

\* \* \* \* \*